(No Model.)

E. P. NOBBS.
HANDLE.

No. 421,751. Patented Feb. 18, 1890.

Witnesses:
J. Staib
Chas. H. Smith

Inventor:
Edward P. Nobbs
per Lemuel W. Serrell atty.

UNITED STATES PATENT OFFICE.

EDWARD P. NOBBS, OF WATERBURY, CONNECTICUT, ASSIGNOR TO THE AMERICAN RING COMPANY, OF SAME PLACE.

HANDLE.

SPECIFICATION forming part of Letters Patent No. 421,751, dated February 18, 1890.

Application filed August 10, 1889. Serial No. 320,388. (No model.)

*To all whom it may concern:*

Be it known that I, EDWARD P. NOBBS, of Waterbury, in the county of New Haven and State of Connecticut, have invented an Improvement in Eyes for Drawer-Handles, of which the following is a specification.

Swinging metallic handles have been made use of, the ends of the handle being in line with each other to form the pivots upon which the handle swings, and eyes of various shapes have been employed for the pivot ends of the handle, and such eyes have been connected with a metallic plate and usually provided with screw-shanks passing through the drawer and receiving nuts.

My present invention relates to an improvement in the eyes made use of for the handle-pivots, whereby such eyes can be formed of heavy wire and connected with the plate, so as to remain in the proper relative position for the handle.

Figure 1:
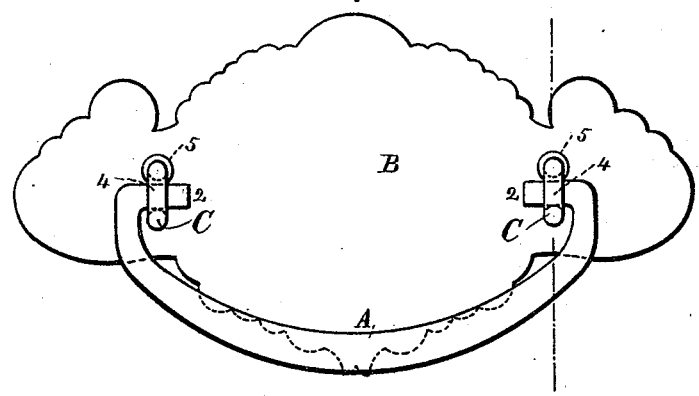
Figure 2:
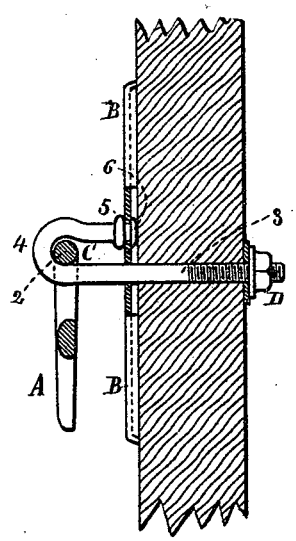

In the drawings, Figure 1 is an elevation of the drawer-handle, eye, and plate; and Fig. 2 is a section of the plate and of the end of the wire forming the handle.

The handle A is to be of any desired size or shape, the ends 2 of the handle being in line with each other, or nearly so, and forming the pivots upon which the handle can be swung. The plate B is of any desired ornamental character, and in such plate there are holes at the proper places for the wires forming the eyes. Each eye C is made of wire of the proper size and strength, having a screw-threaded shank 3 to pass through the drawer and receive the nut D, and the wire is bent into a staple form at 4, the size of which is sufficient to receive freely the pivot end 2 of the handle, and near the end of the wire forming the eye is a flange 5, formed by upsetting or spreading the metal by an endwise pressure, and the extreme end of the wire is passed through a hole in the plate B and riveted up, as shown at 6. By this means each of the eyes is firmly connected with the plate B, and the wire does not require to be bent into the form of a round eye, as shown in my patent, No. 407,898; but I do not limit myself to the specific form of the eye, and the hole in the eye which receives the handle end 2 may be at a greater or less distance from the surface of the plate B, as desired, in order that the handle may hang in the proper manner.

I claim as my invention—

1. The combination, with the drawer-handle A, having the pivot ends 2 and the plate B, of the eyes C, each being formed of a single piece of wire bent into the form of a staple for the reception of the pivot end, and having a flange 5, a screw-threaded shank 3 for the nut D, and riveted at 6, where the end of the wire passes through the plate B, substantially as set forth.

2. The combination, with the drawer-handle having pivots 2 and the plate B, of the eyes C, each being formed of a single piece of wire screw-threaded on the shank 3 for the nut D and bent to pass around the pivot and the end of the wire passing into a hole in the plate and permanently secured thereto, substantially as specified.

Signed by me this 6th day of August, A. D. 1889.

EDWARD P. NOBBS.

Witnesses:
 DAVID N. PLUME,
 F. W. CHESSON.